United States Patent

Alter et al.

[11] 4,021,874
[45] May 10, 1977

[54] BOAT HULL

[75] Inventors: Hobart L. Alter, Capistrano Beach; Peter L. V. Hutchinson, Anaheim, both of Calif.

[73] Assignee: Coast Catamaran Corporation, Irvine, Calif.

[22] Filed: May 23, 1975

[21] Appl. No.: 580,420

Related U.S. Application Data

[62] Division of Ser. No. 352,753, April 18, 1973.

[52] U.S. Cl. .................................................. 9/6 P
[51] Int. Cl.² .......................................... B63B 5/24
[58] Field of Search ................. 9/6 P, 6 R; 114/85, 114/88

[56] References Cited

UNITED STATES PATENTS

| 2,376,753 | 5/1945 | Bowen | 9/6 P |
| 3,080,267 | 3/1963 | Schmalz | 9/6 P |
| 3,531,809 | 10/1970 | Hegg | 9/6 P |
| 3,648,310 | 3/1972 | Butler | 9/6 P |
| 3,811,141 | 5/1974 | Stoeberl | 9/6 P |
| 3,840,926 | 10/1974 | Stoeberl | 9/6 P |
| 3,848,284 | 11/1974 | Livingston | 9/6 P |

Primary Examiner—Trygve M. Blix
Assistant Examiner—Stuart M. Goldstein
Attorney, Agent, or Firm—Fulwider, Patton, Rieber, Lee & Utecht

[57] ABSTRACT

A boat hull fabricated from synthetic plastic sheets. The main body and the deck of the hull are separately vacuum-formed. Plastic foam is then adhered onto the interior surfaces of the sheets. The main body and hull thereafter joined along the gunwale.

6 Claims, 21 Drawing Figures

4,021,874

BOAT HULL

This is a division of application Ser. No. 352,753 filed on Apr. 18, 1973.

BACKGROUND OF THE INVENTION

1. Field of the Invention

The present invention relates generally to the art of molding and more particularly to a novel method for forming a boat hull, or the like.

2. Description of the Prior Art

Various processes for forming boat hulls from Fiberglas and vacuum-formed synthetic plastic sheets are known to the art. The cost of forming Fiberglas hulls however, is appreciable compared to the cost of a vacuum-formed synthetic plastic hull, but the formed plastic sheet hulls do not have the rigidity of Fiberglas hulls. Applicant is aware of the following U.S. Pat. Nos. directed to such processes: 2,976,577, 3,013,922, 3,078,202, 3,080,267, 3,124,626.

SUMMARY OF THE INVENTION

The process of the present invention provides a rigid, but low-cost boat hull utilizing a rigid shell to the inner surfaces of which is adhered fused plastic foam. The shell may consist of a first vacuum-formed synthetic plastic sheet that defines the main body of the hull, and a second vacuum-formed sheet that defines the deck thereof. Plastic foam is adhered onto the interior surfaces of the two sheets after such sheets have been formed into their desired configuration. The foam provides both rigidity and flotation. After the foam has been adhered to the vacuum-formed sheets, the edges of the main body and the deck are secured together so as to define the completed hull.

DESCRIPTION OF THE PREFERRED EMBODIMENT

Figure 7:
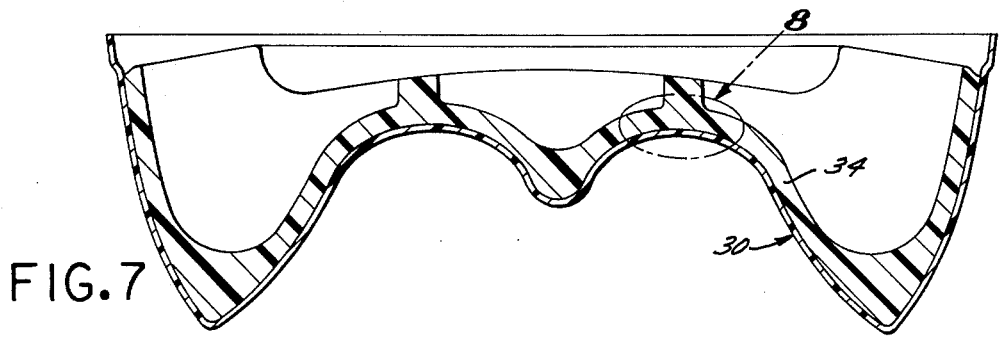
FIG. 7 is a transverse vertical sectional view showing the completed main body of the boat hull.
Figures 13, 14, 15:
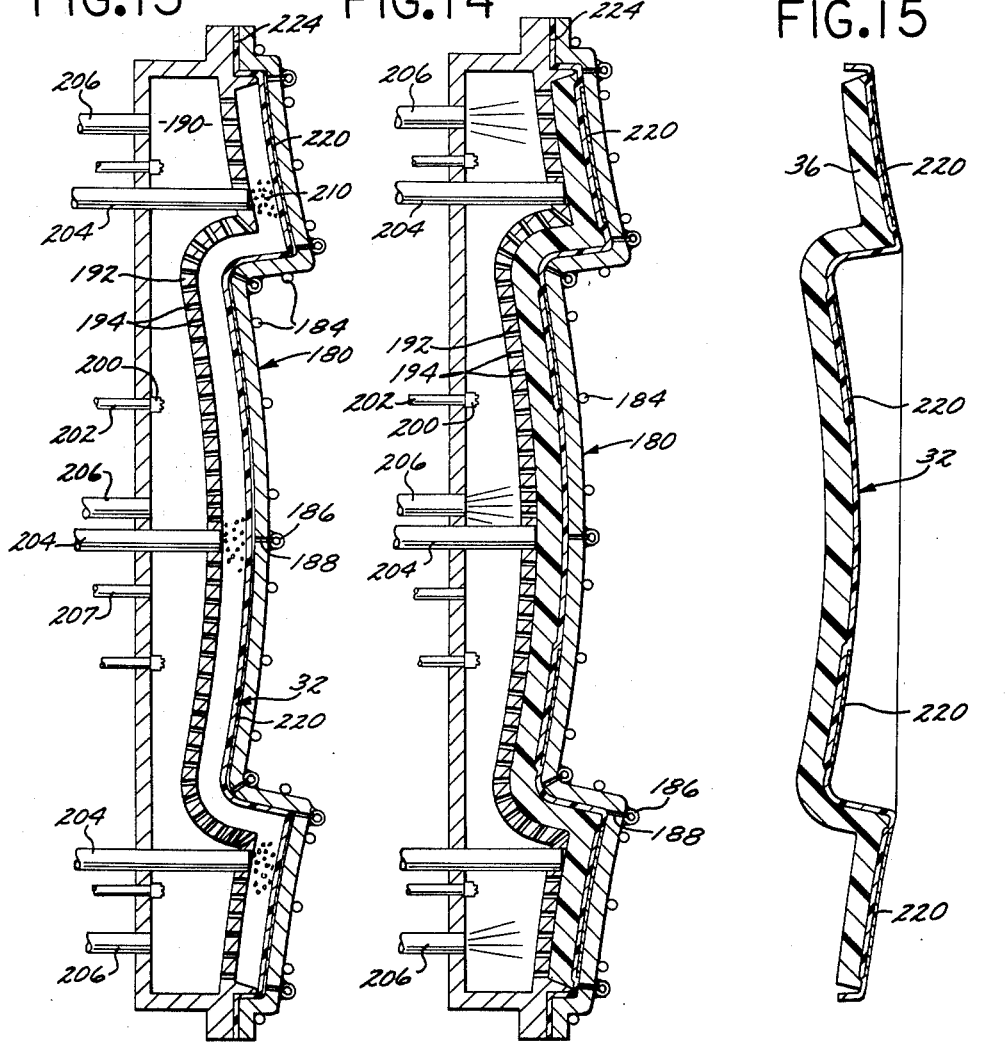
Figure 21:
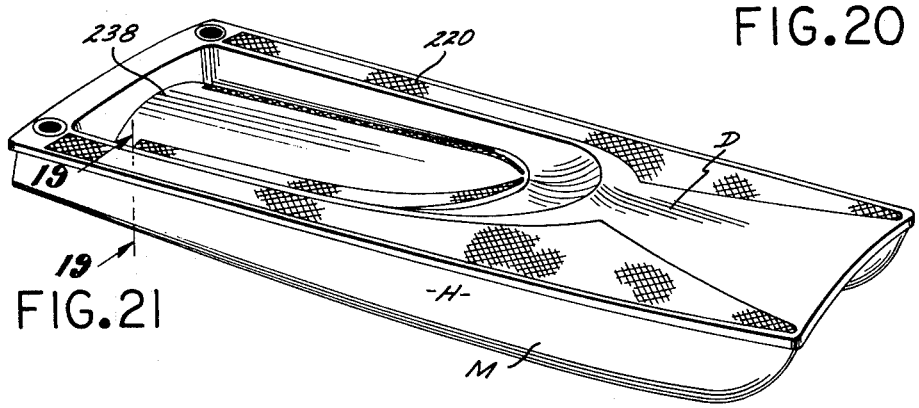
FIG. 21 is a perspective view of a completed boat hull made in accordance with the process of the present invention.

Referring to the drawings, a completed boat hull H, made in accordance with the process of the present invention, is shown in FIG. 21. The boat hull H comprises a main body M and a deck portion D. A transverse vertical sectional view of the completed main body M is shown in FIG. 7, while a transverse vertical cross section of a completed deck D is shown in FIG. 15. The main body M is defined by a first vacuum-formed synthetic plastic sheet, generally designated 30, and deck D is defined by a second vacuum-formed synthetic plastic sheet, generally designated 32. As indicated in FIGS. 7 and 15, the interior surfaces of the sheets 30 and 32 are affixed to fused synthetic plastic foam designated 34 and 36, respectively.

Figure 1:
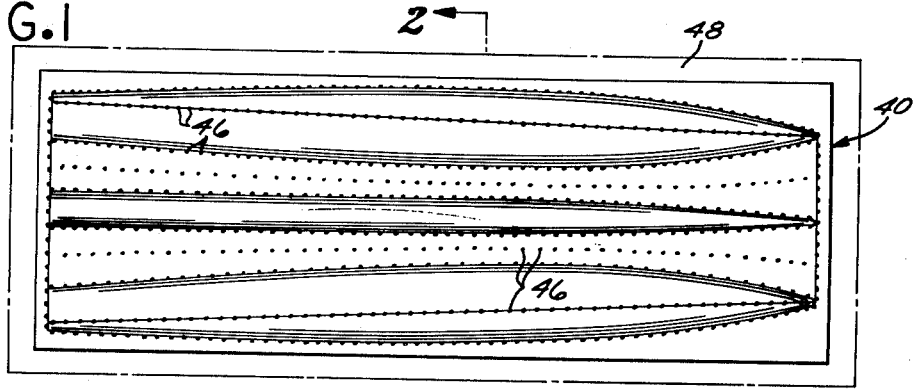
FIG. 1 is a top plan view of a vacuum mold utilized in forming the main body of a boat hull in accordance with the process of the present invention.
Figure 2:
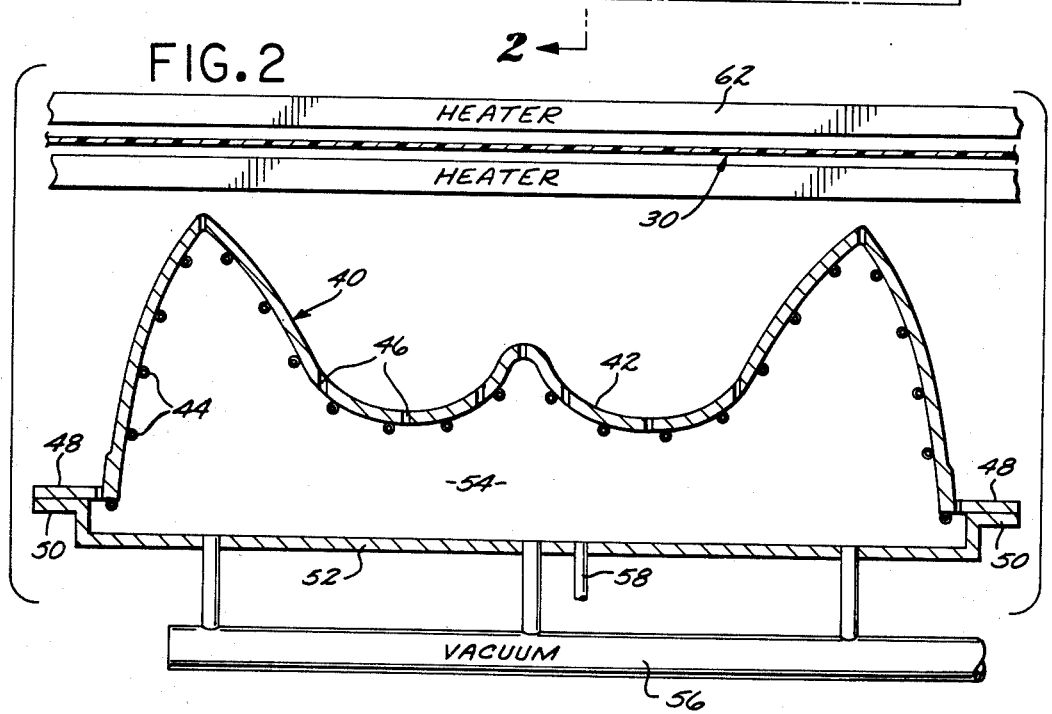
FIG. 2 is a transverse vertical sectional view taken in enlarged scale along line 2—2 of FIG. 1 during a molding step of said process.
Figure 3:
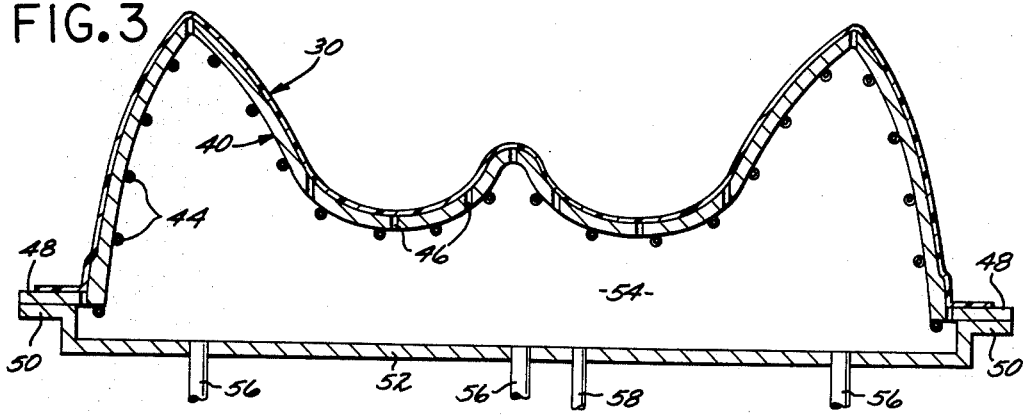
FIG. 3 is a view similar to FIG. 2 showing the vacuum forming of a sheet into the configuration of the main body of said boat hull.

More particularly, the synthetic plastic sheet 30 of the main body unit M is vacuum-formed over a male vacuum mold, generally designated 40, shown in top plan view in FIG. 1. Referring additionally to FIGS. 2 and 3, vacuum mold 40 is operated in a horizontal position with its upper surface 42 receiving the plastic sheet 30 to be formed. Such upper surface 42 defines the configuration of the main body M of boat hull H. The underside of vacuum mold 40 is provided with a plurality of longitudinally extending, transversely spaced heating lines 44. Vacuum mold 40 is also formed with a plurality of spaced air passages 46. The side flanges 48 of vacuum mold 40 rest upon complementary flanges 50 of a base 52. The air chamber 54 defined between the upper surface of base 52 and vacuum mold 40 is connected to a vacuum line 56. Additionally, an air line 58 is in communication with this air chamber 54. As shown particularly in FIG. 2, a conventional sandwich type heater 62 is provided for heating both sides of the synthetic plastic sheet 30.

In forming the plastic sheet 30 into the configuration of main body M, both sides thereof are first heated by means of the aforementioned heater 62, as indicated in FIG. 2. Previously, mold 40 has been heated to the molding temperature of the plastic sheet 30 by means of hot water flowing through lines 44. After sheet 30 has been heated by heater 62, it is positioned on the upper surface of mold 40 and vacuum is applied to the chamber 54 by means of vacuum line 56. When vacuum is applied to chamber 54, the plastic sheet 30 will be drawn into close engagement with the upper surface 42 of mold 40, as indicated in FIG. 3. At the conclusion of the molding step, air under superatmospheric pressure is directed into chamber 54 by means of air line 58 so as to force the formed plastic sheet 30 free of mold 40.

Figure 4:
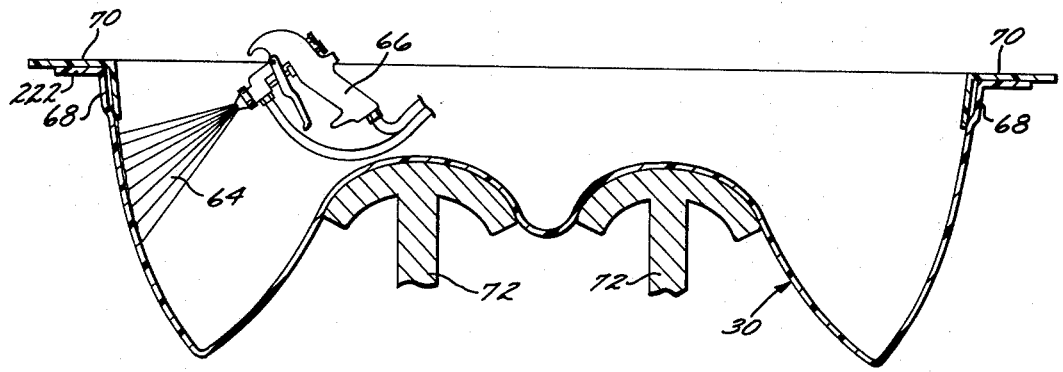
FIG. 4 is a transverse vertical sectional view showing the formed main body sheet of the hull during a subsequent step in the process.

Referring now to FIG. 4, the interior surface 64 of the formed main body sheet 30 is next sprayed with a heat-activated adhesive 64, as by means of a spray gun 66. It is important to note, however, that the gunwale portion 68 of the interior of formed sheet 30 is masked by means of masking elements 70 so as to preclude such adhesive from contacting this portion of the formed plastic sheet 30. During the adhesive spraying step, formed sheet 30 rests upon a suitable frame 72.

Figure 5:
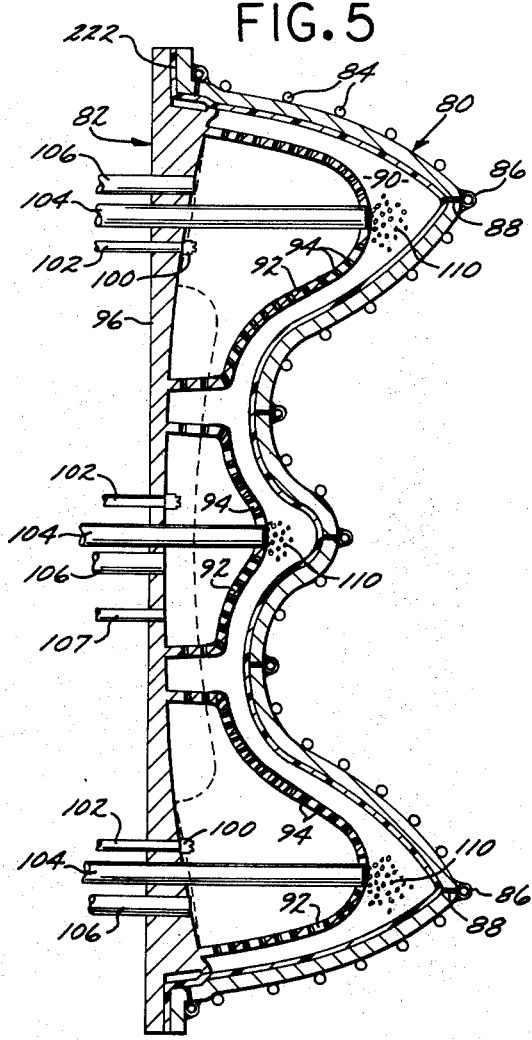
FIGS. 5 and 6 are transverse vertical sectional views showing the application of foam to the formed main body sheet of FIG. 4.
Figure 6:
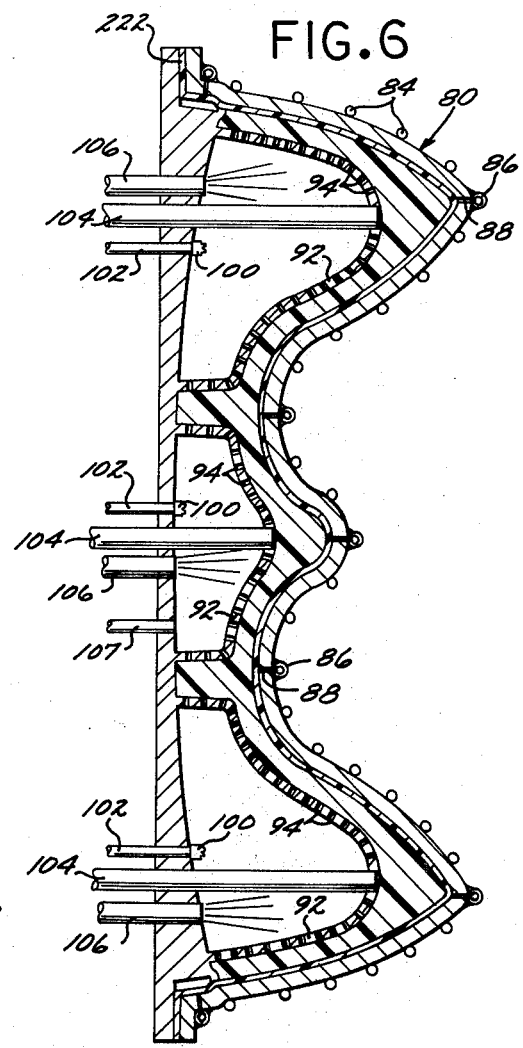

Referring now to FIGS. 5 and 6, there is shown the arrangement for fusing a heat-expandable, synthetic plastic foam adjacent the interior surfaces of the formed main body sheet 30. This arrangement includes a metallic nest, generally designated 80, the underside of which has the exterior configuration of the formed main body sheet 30, and a complementary steam chest, generally designated 82, which interfits with nest 80. Nest 80 is provided on its exterior surfaces with a plurality of longitudinally extending, transversely spaced heating and cooling tubes 84. Nest 80 is also provided with a plurality of longitudinally extending vacuum lines 86, each of which is in communication with a plurality of ports 88 formed in nest 80, for applying vacuum to the cavity 90 defined between the interior of the next 80 and steam chest 82. Steam chest 82 includes a plurality of depending hollow probes 92, each formed with a plurality of apertures 94. Probes 92 are integral with top plate 96 of steam chest 82. A plurality of water spray nozzles 100 connected to water lines 102 are positioned at spaced points along the underside of top plate 96 within the probes 92. Additionally, a plurality of foam fill pipes 104 extend through top plate 96 into cavity 90. The interior of probes 92 are in communication with a plurality of steam lines 106, and an air line 107.

Figure 8:
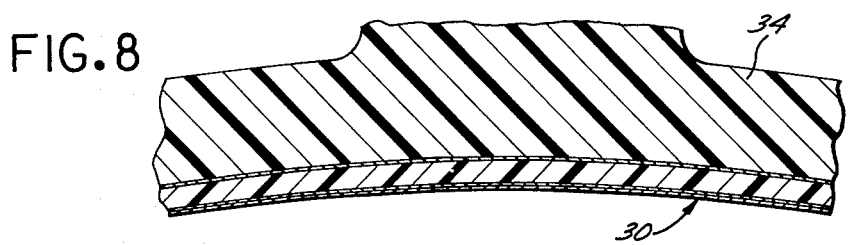
FIG. 8 is an enlarged view of the encircled area designated 8 in FIG. 7.
Figure 9:
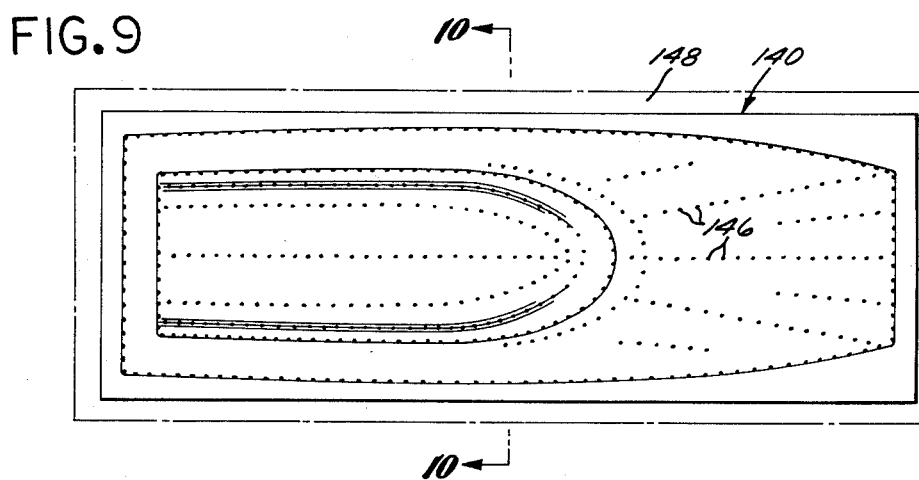
FIG. 9 is a top plan view of a vacuum mold utilized in forming the deck of the boat hull in accordance with the process of the present invention.

In the foam fusing step, the formed main body sheet 30 is retained in tight engagement with the interior of the nest 80 by means of vacuum applied through lines 86. The steam chest 82 is then positioned within the confines of nest 80, as indicated in FIG. 5. Nest 80 is heated by hot water flowing through tubes 84. Beads of a suitable synthetic plastic, such as polystyrene, are then blown into the cavity 90 by means of foam fill pipes 104, as indicated at 110 in FIG. 5. Thereafter, steam is forced through the steam lines 106, such steam flowing through the probe apertures 94, so as to expand and fuse the beads into a solid mass of foam 34, as indicated in FIG. 6. Additionally, the heat applied by the tubes 84 and steam lines 106 serves to activate the adhesive 64 which was sprayed on the interior of the formed sheet 30 in the manner indicated in FIG. 4. In this manner the fused foam adjacent the interior surfaces of the formed sheet 30 will be rigidly adhered to such surfaces, as shown in FIG. 8. Thereafter, cold water is passed through tubes 84 while cold water is sprayed through nozzles 100. Nest 80, steam chest 82 and formed sheet 30 with its adhered fused foam 34 are then cooled to to about 170° F. to prevent overcooking the foam. Steam chest 82 is removed. Compressed air may be directed through air lines 207 to loosen foam 34 from steam chest 82. The main body M is then removed from the nest 80.

Figure 10:
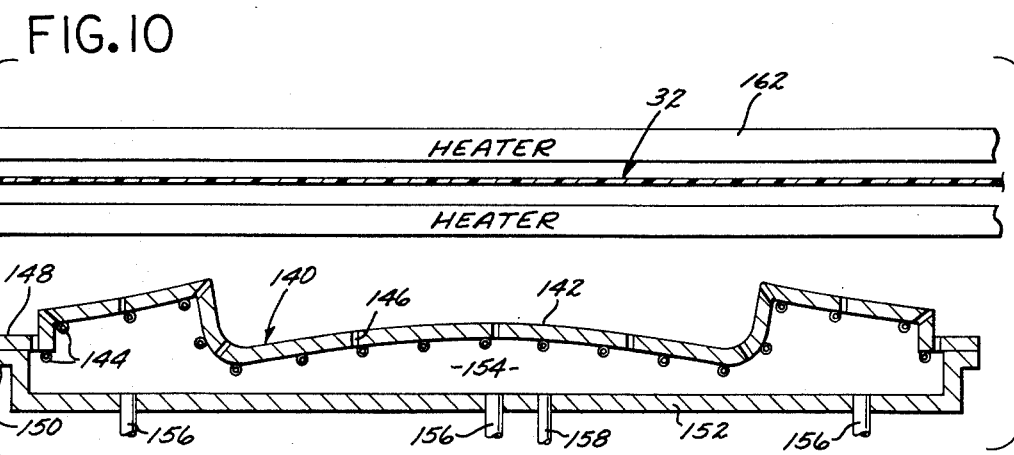
FIGS. 10–15 are views corresponding to FIGS. 2–7, respectively, but showing the molding of the deck of the boat hull.
Figure 11:
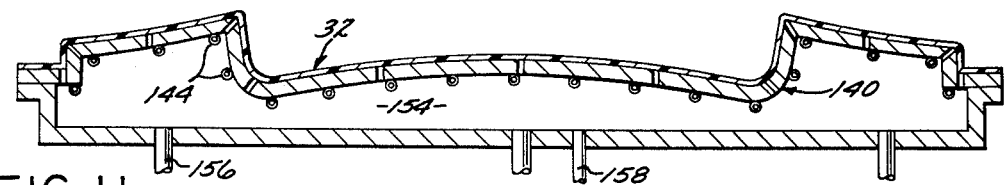

Referring to FIGS. 9–15, the deck D of the boat hull H is formed in the same manner as the main body M. This arrangement utilizes a male vacuum mold, generally designated 140. Mold 140 is shown in top plan view in FIG. 9. Referring additionally to FIGS. 10 and 11, vacuum mold 140 is operated in a horizontal position with its upper surface 142 receiving the plastic sheet 32 to be formed. Such upper surface 142 defines the configuration of the deck D of boat hull H. The underside of vacuum mold 140 is provided with a plurality of longitudinally extending, transversely spaced heating lines 144. Vacuum mold 140 is also formed with a pluraltiy of spaced air passages 146. The side flanges 148 of vacuum mold 140 rest upon complementary flanges 150 of a base 152. The air chamber 154 defined between the upper surface of base 152 and vacuum mold 140 is connected to vacuum lines 156. Additionally, an air line 158 is in communication with this air chamber 154. As shown particularly in FIG. 10, a conventional sandwich type heater 162 is provided for heating both sides of the synthetic plastic sheet 30.

In forming the plastic sheet 32 into the configuration of deck D both sides thereof are first heated by means of the aforementioned heater 162, as indicated in FIG. 10. Previously, mold 140 has been heated to the molding temperature of the plastic sheet 32 by means of hot water flowing through lines 144. After sheet 32 has been heated by heater 162, it is positioned over the upper surface of mold 140 and vacuum is applied to the chamber 154 by means of vacuum lines 156. When vacuum is applied to chamber 154, the plastic sheet 32 will be drawn into close engagement with the upper surface 142 of mold 140, as indicated in FIG. 11. At the conclusion of the molding step, air under superatmospheric pressure is directed into chamber 154 by means of air line 158 so as to force the formed plastic sheet 32 free of mold 140.

Where plastic sheets 30 and 32 are ABS, such sheets will be heated to about 360–380° F. for forming, and the molds 40 and 140 will be held at about 180–200° F. during the vacuum forming operation.

Figure 12:
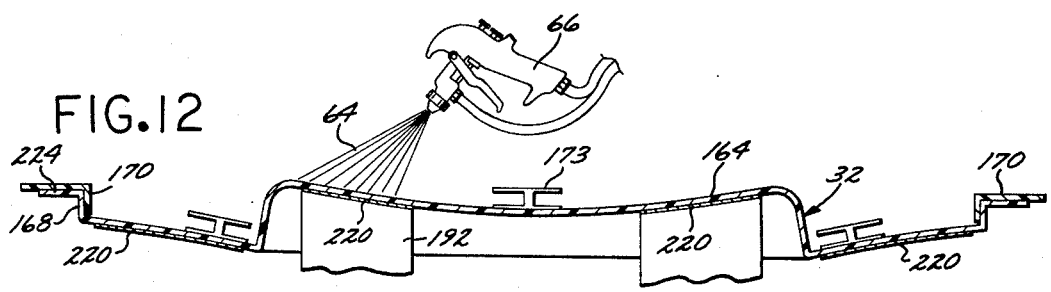

Referring now to FIG. 12, the interior surface 164 of the formed deck sheet 32 is next sprayed with the heat-activated adhesive 64, as by means of the spray gun 66, such sheet being inverted during this spraying step. It is important to note, however, that the gunwale portions 168 of the interior of formed sheet 32 are masked by means of masking elements 170 so as to preclude such adhesive from contacting this portion of the formed plastic sheet 32. During the adhesive spraying step, formed sheet 32 rests upon a suitable frame 172. At this time reinforcing elements 173 (not shown) may be adhered to the underside of formed sheet 32.

Referring now to FIGS. 13 and 14, there is shown the arrangement for fusing synthetic plastic foam adjacent the interior surfaces of the formed deck sheet 32. This arrangement includes a metallic nest, generally designated 180, the underside of which has the exterior configuration of the formed deck sheet 32, and a complementary steam chest, generally designated 132, which interfits with nest 180. Nest 180 is provided on its exterior surfaces with a plurality of longitudinally extending, transversely spaced heating and cooling tubes 134. Nest 180 is also provided with a plurality of longitudinally extending vacuum lines 186, each of which is in communication with a plurality of ports 188 formed in nest 180, for applying vacuum to the cavity 190 defined between the interior of the nest 180 and steam chest 182. Steam chest 182 includes a depending bottom plate 192 formed with a plurality of apertures 194 and having the configuration of the top surface of formed deck sheet 32. Bottom plate 192 is integral with top plate 196. Additionally, a plurality of foam fill pipes 204 extend through top plate 196 into cavity 190. The interior of cavity 190 is in communication with a plurality of steam lines 206 and an air line 207.

In the foam fusing step, the formed deck sheet 32 is retained in tight engagement with the interior of the nest 180 by means of vacuum applied through lines 186. The steam chest 182 is then positioned within the confines of nest 180, as indicated in FIG. 13. Nest 180 is heated by hot water flowing through tubes 184. Beads of a suitable synthetic plastic, such as polystyrene, are then blown into the cavity 190 by means of foam fill pipes 204, as indicated at 210 in FIG. 13. Thereafter, steam is forced through the steam lines 206, such steam flowing through the apertures 194, so as to expand and fuse the beads into a solid mass of foam 36, as indicated in FIG. 14. Additionally, the heat applied by tubes 184 and steam lines 206 serves to activate the adhesive 64 which was sprayed on the interior of the formed sheet 32 in the manner indicated in FIG. 12. In this manner the fused foam adjacent the interior surfaces of the formed sheet 32 will be rigidly adhered to such surfaces. Thereafter, cold water is passed through tubes 184 while cold water is sprayed through nozzles 200. Nest 180, steam chest 182 and formed sheet 32 with its adhered fused foam 36 are then cooled. Steam chest 182 is removed. Air under superatmospheric pressure may be applied through air line 207 to assist in freeing foam 36 from inner plate 194. Thereafter, the deck D is removed from the nest 180.

It is an important feature of the present invention that during the fusing of the foam adjacent formed sheets 30 and 32, the nests 80 and 180 prevent the expanding foam beads from roughening these sheets because the latter are tightly confined. This arrangement also insures against the formation of ripples or bumps in the sheets 30 and 32. In fact, ripples or bumps present in the sheets after the vacuum forming step can be smoothed out during the foaming step.

It is another important feature in the fabrication of the deck D that synthetic plastic, non-skid panels 220 are adhered to and embedded within the upper surfaces of the formed plastic sheet 32. Thus, referring first to FIG. 12, non-skid panels 220 will be adhered to spaced apart portions of the exterior surface of formed sheet 32 prior to the time such formed sheet is disposed within nest 180. A heat activated adhesive, similar to that described hereinabove, may be utilized for this purpose. When the formed sheet 32 and the non-skid panels 220 are engaged with the nest 180, they will have the appearance shown in FIG. 13. Referring now to FIG. 14, when the plastic foam beads are heated, they will expand under pressure so as to cause the non-skid panels 220 to be embedded within the upper surface of the deck, as indicated in FIG. 14.

Thus, when the formed deck sheet 32 and its fused and adhered foam 36 is removed from nest 180, the upper surface of non-skid panels 220 will be contiguous with the upper surface of the formed sheet 32, as shown in FIG. 15.

Figure 16:
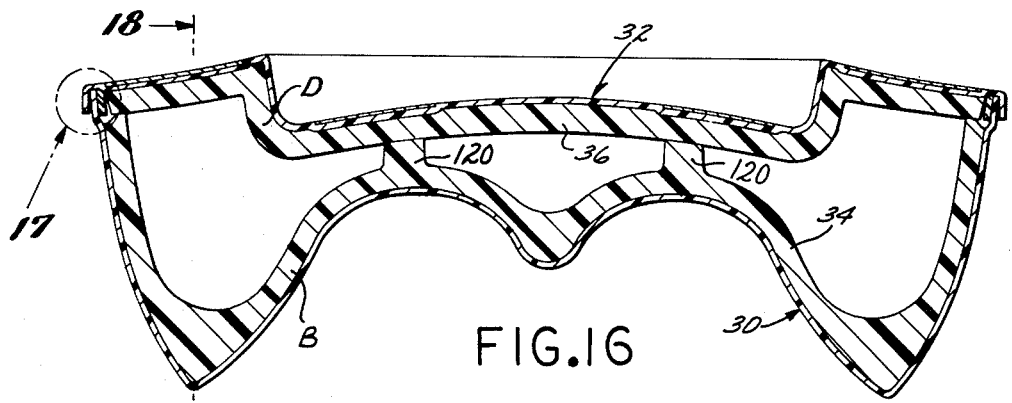
FIG. 16 is a transverse vertical sectional view showing the main body and deck joined together.
Figures 17, 18, 19:
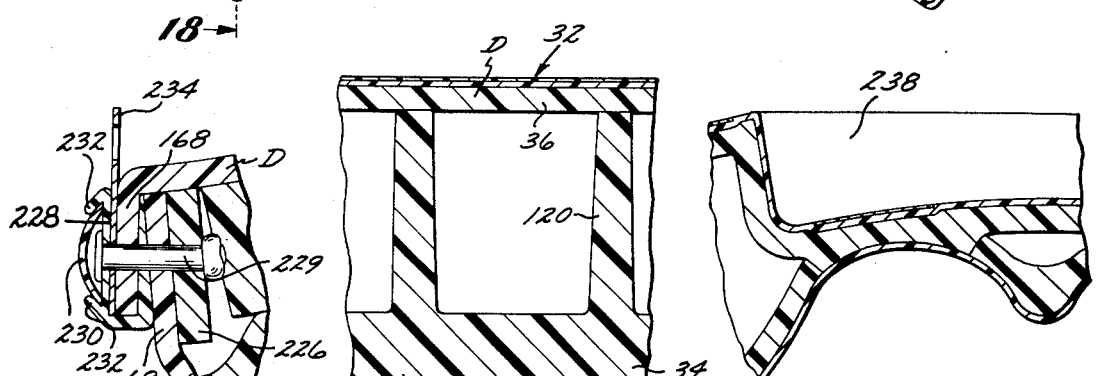
FIG. 17 is an enlarged view of the encircled gunwale area designated 17 in FIG. 16.
FIG. 18 is a broken transverse vertical sectional view taken along line 18—18 of FIG. 21.
FIG. 19 is a fragmentary vertical sectional view taken along line 19—19 of FIG. 21.
Figure 20:
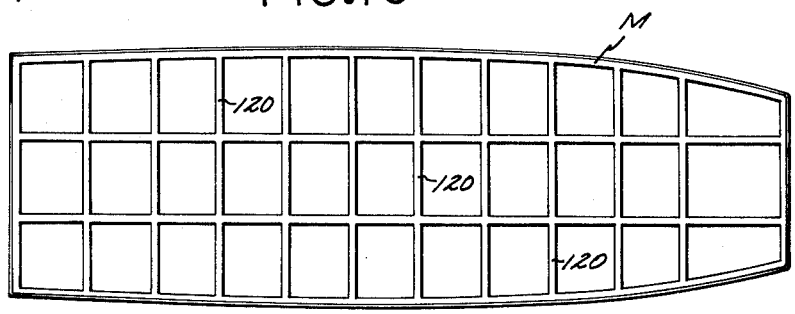
FIG. 20 is a top plan view of the main body shown in FIG. 7.

Referring now to FIG. 16, the final step in fabricating the boat hull M is to join the deck D with the body B. This is effected by telescopically interfitting the gunwale portion 68 of the main body M within the depending gunwale portion 168 of deck D. First, however, excess material 222 and 224 is cut from the gunwale portions 68 and 168 of the main body M and deck D, respectively. Thereafter, an adhesive is applied to these gunwale portions and deck D is laid upon body M. Referring to FIG. 17, a plurality of back-up blocks 226, preferably formed of a noncorrosive, hard material such as aluminum, are adhered to the interior of the body gunwale portion 68 before the deck D is placed thereupon. After the deck has been telescopically nested upon the top of main body M, a synthetic plastic filler strip 228 of generally U-shaped configuration is positioned on either side of the depending gunwale 163 of deck D. With continued reference to FIG. 17, a plurality of pop-type rivets 229 are then driven through filler strip 228, gunwales 168 and 68 of the deck and main body M and the backing plate 226 at longitudinally spaced points along the length of the hull. Finally, an arcuate cover 230 is snapped between a pair of outwardly, angularly extending lips 232 formed on the upper and lower portions of filler strip 228. As indicated in FIG. 17, the rivets 229 may also be utilized to anchor hardware, such as chain plates 234 to the hull.

Referring to FIG. 18, foam 36 of deck D may be glued to the upper ends of main body ribs 120 to increase rigidity. Referring to FIG. 19, where the vertical distance between main body M and deck D is reduced, as in the cockpit area 238, foam is not applied to the underside of deck D. Instead, such underside rests directly upon foam 34 of main body M.

The completed boat hull H will provide extreme rigidity because of the fused foam 34 and 36, with such foam also affording sufficient buoyancy to render the hull unsinkable. The hull can be manufactured at low cost. It will also provide an attractive high gloss appearance and with all these advantages will be light in weight. It should be observed that where the vacuum formed sheets 30 and 32 are of a material which bonds to the foam 34 and 36 when heated, it is not necessary to utilize the heat-activated adhesive 64.

Various other modifications may be made with respect to the foregoing detailed description without departing from the spirit of the present invention. By way of example, the hull shell may consist of a rigid material, such as Fiberglas or aluminum, rather than the vacuum formed sheets 30 and 32. Moreover, while the aforedescribed process is described in conjuction with the manufacture of a boat hull, such process may also be utilized to form other structures requiring a smooth skin or shell provided with rigidifying foam backing.

We claim:
1. A closed boat hull, comprising:
   a main body shell consisting of a vacuum-formed synthetic plastic sheet and having a heat-activated adhesive on its interior surfaces except along the gunwale portion of said shell;
   a layer of fused synthetic plastic foam secured to the interior surfaces of said main body shell by said heat-activated adhesive except along the gunwale portion of said shell;
   a plurality of longitudinal and transverse upstanding main body ribs integral with said foam layer;
   a deck shell complementary to said main body shell consisting of a vacuum-formed synthetic plastic sheet and having a heat-activated adhesive on its interior surfaces except along the gunwale portion of said shell;
   a layer of fused synthetic plastic foam secured to the interior surfaces of said deck shell by said adhesive except along the gunwale portion of said shell, with the underside of said foam layer being adhered to the upper ends of said main body ribs, the foam affording sufficient buoyancy to render the boat hull unsinkable and also providing rigidity for said boat hull without utilizing other than said main body and deck shells; and
   with the gunwale portions of said shells telescopically interfitting and being interconnected at longitudi- nally spaced points by fastening means extending through said gunwale portions.

2. A boat hull as set forth in claim 1 wherein non-skid panels are adhered to and embedded within the upper surface of the deck shell contiguous with such upper surface.

3. A boat hull as set forth in claim 1 wherein the outer periphery of the deck shell is formed with a depending gunwale element that overlaps the upper edge of the gunwale portion of the main body shell, and wherein a backing block is adhered inwardly of the gunwale portion of said main body shell to receive said fastening means.

4. A boat hull as set forth in claim 2 wherein the outer periphery of the deck shell is formed with a depending gunwale element that overlaps the upper edge of the gunwale portion of the main body shell, and wherein a backing block is adhered inwardly of the gunwale portion of said main body shell to receive said fastening means.

5. A boat hull as set forth in claim 3 wherein certain of said fastening means serve to anchor hardware to the gunwale portion of said shells.

6. A boat hull as set forth in claim 4 wherein certain of said fastening means serve to anchor hardware to the gunwale portion of said shells.

* * * * *